US008829383B2

(12) United States Patent
Onodera et al.

(10) Patent No.: US 8,829,383 B2
(45) Date of Patent: Sep. 9, 2014

(54) WIRE ELECTRIC DISCHARGE MACHINE AND WIRE ELECTRIC DISCHARGE MACHINING METHOD

(75) Inventors: Yasuo Onodera, Chiyoda-ku (JP); Tamayo Ohata, Chiyoda-ku (JP); Tatsushi Sato, Chiyoda-ku (JP); Hidetaka Miyake, Chiyoda-ku (JP); Takashi Yuzawa, Chiyoda-ku (JP); Atsushi Taneda, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 227 days.

(21) Appl. No.: 13/002,294

(22) PCT Filed: Jul. 3, 2008

(86) PCT No.: PCT/JP2008/062060
§ 371 (c)(1),
(2), (4) Date: Dec. 30, 2010

(87) PCT Pub. No.: WO2010/001472
PCT Pub. Date: Jan. 7, 2010

(65) Prior Publication Data
US 2011/0100959 A1 May 5, 2011

(51) Int. Cl.
*B23H 7/00* (2006.01)
*B23H 7/14* (2006.01)
*G06F 19/00* (2011.01)
*B23H 7/06* (2006.01)

(52) U.S. Cl.
CPC ..................................... *B23H 7/065* (2013.01)
USPC ...................... 219/69.13; 219/69.12; 700/162

(58) Field of Classification Search
CPC .... B29C 65/22; B29C 65/221; B29C 65/222; B29C 59/10; B23H 7/02
USPC .............................. 219/69.12, 69.13; 700/162
See application file for complete search history.

(56) References Cited

U.S. PATENT DOCUMENTS 4,559,601 A * 12/1985 Kishi et al. .................... 700/187
4,649,252 A * 3/1987 Obara ......................... 219/69.12
4,700,039 A * 10/1987 Konno et al. ............... 219/69.16
4,713,517 A * 12/1987 Kinoshita ................... 219/69.12

(Continued)

FOREIGN PATENT DOCUMENTS

| JP | 63-229228 A | 9/1988 |
| JP | 2004-148472 A | 5/2004 |
| JP | 2006-123065 A | 5/2006 |
| JP | 2007-075996 A | 3/2007 |

*Primary Examiner* — Dana Ross
*Assistant Examiner* — Gyounghyun Bae
(74) *Attorney, Agent, or Firm* — Sughrue Mion, PLLC; Richard C. Turner

(57) ABSTRACT

Based on a discharging gap value and machining allowance value stored in a corner-control-information storing means 20, a speed-ratio calculating means 23 being a machining-volume calculating means calculates machining volumes of a straight line portion and a corner portion to calculate a volume ratio therebetween.

A corner-portion-speed calculating means 24 calculates a machining feed speed at the corner portion based on a volume ratio calculated by the speed-ratio calculating means 23, and then outputs to a servo amplifier 8 on the basis of the length of a pre-corner section outputted by a pre-corner-section calculating means 21 and the length of a post-corner section outputted by a post-corner-section calculating means 22, instructions about machining feed speeds from entering the pre-corner section till getting out of the post-corner section.

10 Claims, 13 Drawing Sheets

(56) References Cited

U.S. PATENT DOCUMENTS

| | | | | |
|---|---|---|---|---|
| 4,725,706 A | * | 2/1988 | Inoue | 219/69.12 |
| 4,746,782 A | * | 5/1988 | Weber | 219/69.17 |
| 4,798,929 A | * | 1/1989 | Itoh | 219/69.12 |
| 4,820,894 A | * | 4/1989 | Francois et al. | 219/69.12 |
| 4,826,580 A | * | 5/1989 | Masuzawa et al. | 205/649 |
| 4,837,415 A | | 6/1989 | Magara et al. | |
| 4,894,504 A | * | 1/1990 | Truty | 219/69.12 |
| 4,985,608 A | * | 1/1991 | Morishita et al. | 219/69.12 |
| 5,015,814 A | * | 5/1991 | Morishita | 219/69.12 |
| 5,041,984 A | * | 8/1991 | Watanabe | 700/162 |
| 5,233,147 A | * | 8/1993 | Magara | 219/69.12 |
| 5,267,141 A | * | 11/1993 | Morita et al. | 700/32 |
| 5,453,592 A | * | 9/1995 | Takeuchi et al. | 219/69.17 |
| 5,756,954 A | * | 5/1998 | Kamiguchi et al. | 219/69.12 |
| 5,919,380 A | * | 7/1999 | Magara et al. | 219/69.16 |
| 6,028,281 A | * | 2/2000 | Yamada et al. | 219/69.12 |
| 6,621,032 B1 | * | 9/2003 | Katou et al. | 219/69.12 |
| 6,627,835 B1 | * | 9/2003 | Chung et al. | 219/69.12 |
| 6,980,879 B2 | * | 12/2005 | Kurihara et al. | 700/162 |
| 7,262,381 B2 | * | 8/2007 | Hiraga et al. | 219/69.12 |
| 7,465,898 B2 | * | 12/2008 | Kaneko | 219/69.12 |
| 2002/0002417 A1 | * | 1/2002 | Irie | 700/162 |
| 2004/0256362 A1 | * | 12/2004 | Sato et al. | 219/69.12 |
| 2005/0263493 A1 | * | 12/2005 | Kurihara et al. | 219/69.12 |
| 2006/0065638 A1 | * | 3/2006 | Sasaki et al. | 219/69.13 |

\* cited by examiner

MACHINING-CONDITION
-COLUMN GROUP A

| MACHINING CONDITION NAME | ... | $E\_A_{n-2}$ | $E\_A_{n-1}$ | $E\_A_n$ |
|---|---|---|---|---|
| DISCHARGE GAP | ... | $h\_A_{n-2}$ | $h\_A_{n-1}$ | $h\_A_n$ |
| OFFSET | ... | $y\_A_{n-2}$ | $y\_A_{n-1}$ | $y\_A_n$ |
| APPROACHING QUANTITY | ... | $f\_A_{n-2}$ | $f\_A_{n-1}$ | $f\_A_n$ |
| MACHINING ALLOWANCE | ... | $s\_A_{n-2}$ | $s\_A_{n-1}$ | $s\_A_n$ |

MACHINING-CONDITION
-COLUMN GROUP B

| MACHINING CONDITION NAME | ... | $E\_B_{n-2}$ | $E\_B_{n-1}$ | $E\_B_n$ |
|---|---|---|---|---|
| DISCHARGE GAP | ... | $h\_B_{n-2}$ | $h\_B_{n-1}$ | $h\_B_n$ |
| OFFSET | ... | $y\_B_{n-2}$ | $y\_B_{n-1}$ | $y\_B_n$ |
| APPROACHING QUANTITY | ... | $f\_B_{n-2}$ | $f\_B_{n-1}$ | $f\_B_n$ |
| MACHINING ALLOWANCE | ... | $s\_B_{n-2}$ | $s\_B_{n-1}$ | $s\_B_n$ | r : wire radius $y_{n-1}$ : offset at n-1th cutting operation $y_n$ : offset at nth cutting operation $f_n$ : approaching quantity at nth cutting operation $h_{n-1}$ : discharge gap at n-1th cutting operation $h_n$ : discharge gap at nth cutting operation $s_n$ : machining allowance at nth cutting operation

WIRE ELECTRIC DISCHARGE MACHINE AND WIRE ELECTRIC DISCHARGE MACHINING METHOD

CROSS REFERENCE TO RELATED APPLICATIONS

This application is a National Stage of International Application No. PCT/JP2008/062060 filed Jul. 3, 2008 the contents of which are incorporated herein by reference in its entirety.

TECHNICAL FIELD

The present invention relates to a wire electric discharge machine and a wire electric discharge machining method.

BACKGROUND ART

When a workpiece is machined to have a corner shape by regular wire electric discharge machining, a corner shape is first formed by rough machining so that a finishing allowance preliminary remains. Next, the electrical condition for the remaining finishing allowance is gradually changed to that of the final machining, and two or more machining operations are performed with its offset quantity being step by step decreased to improve accuracy in the corner shape (these machining operations are collectively called as skim cuts). The shape accuracy in a corner portion is easily degraded. One of the reasons is that there is a difference between a machining quantity in a straight line portion and a machining quantity in a corner portion. The smaller the corner radius is, the larger the difference between these machine quantities becomes.

In a process of machining a workpiece, machining a corner portion at the same feed speed as that for a straight line portion produces variations in machining quantity to cause an insufficient machining or an over machining. This causes difficulties for machining a corner portion with a high accuracy originally demanded. Therefore, in order to improve corner shape errors produced by insufficient machining or over machining, it is necessary, especially in finish machining, to control to equalize machining quantities per unit time between a straight line portion and a corner portion.

For dealing with such a demand, a controlling method is disclosed in Patent document 1, in which a machining quantity of a corner portion is estimated from a discharge frequency and a voltage drop value in the average machining voltage, to control a machining feed speed at the corner portion according to the discharge frequency and the voltage drop value in the average machining voltage.

In Patent document 2, a machining quantity at a corner portion is approximated by a removal machining distance that is the length of the perpendicular dropped from an intersection point of a discharging gap circle with a previously machined surface to the current machining surface so as to control a machining feed speed at the corner portion according to variations in the removal machining distance.

[Patent document 1] Japanese Patent Application Laid-Open No. 2006-123065
[Patent document 2] Japanese Patent Application Laid-Open No. 2004-148472

DISCLOSURE OF THE INVENTION

Problem to be Solved by the Invention

In Patent document 1, variation in machining quantity at a corner portion is detected by variation in discharge frequency and a voltage drop in the average machining voltage. However, because machining quantity at the corner portion is not estimated, machining errors in the corner shape occurs. In addition, such a feedback-like controlling method that controls according to the variation in discharge frequency and the average machining voltage involves delaying in controlling, so that the method cannot respond to sudden changes in machining quantity that occur when entering and/or getting out of the corner shape. This causes machining errors in the corner shape.

In Patent document 2, machining quantity at a corner portion is approximated by a removal machining distance. However, because the machining quantity at the corner portion is not precisely estimated, the approximation error for the machining quantity varies depending on a corner radius, and a corner shape machining error becomes large depending on a corner radius.

Means for Solving Problem

In order to solve the problems described above, a wire electric discharge machine according to the present invention includes a machining-feed-speed controlling means that controls a machining feed speed of a wire electrode that is moved relatively to a workpiece according to a machining program, and the machining-feed-speed controlling means includes
    a straight-line-portion speed controlling means that controls the machining feed speed when a straight-line-shape portion is machined, and
    a corner-portion speed controlling means that controls the machining feed speed when a corner shape portion is machined,
    wherein the corner-portion speed controlling means includes
    a machining-volume calculating means that calculates, according to the machining program, a volume to be machined during machining the straight-line-shape portion and a volume to be machined during machining the corner-shape portion, and
    a corner-portion-speed calculating means that calculates, based on a calculation result from the machining-volume calculating means, the machining feed speed during machining the corner shape.

In another wire electric discharge machine according to the invention, the corner-portion speed controlling means includes a corner-control-information storing means that stores information about a discharging gap and a machining allowance, and the machining-volume calculating means calculates the volume to be machined during machining the straight-line-shape portion and the volume to be machined during machining the corner-shape portion, based on the information stored in the corner-control-information storing means.

In another wire electric discharge machine according to the invention, the corner-portion speed controlling means further includes
    a pre-corner-section calculating means that calculates, in machining the straight-line-shape portion, the length of a pre-corner section where the machining quantity per unit moving distance increases or decreases before entering a machining operation of the corner-shape portion, and
    a post-corner-section calculating means that calculates, in machining the corner-shape portion, the length of a post-corner section where the machining quantity per unit moving distance increases or decreases before entering a machining operation of another straight-line-shape portion.

In another wire electric discharge machine according to the invention, the pre-corner-section calculating means and the post-corner-section calculating means calculate, based on information stored in the corner-control-information storing means, the length of the pre-corner section and the length of the post-corner section, respectively.

In another wire electric discharge machine according to the invention, the corner-portion speed controlling means further includes
a mid-corner section detecting means that detects, in machining the corner-shape portion, existence of a mid-corner section where the machining quantity per unit moving distance is constant, wherein,
based on a detection result from the mid-corner section detecting means, the machining-volume calculating means selects a machining volume calculation equation for machining the corner-shape portion, and
the pre-corner-section calculating means selects a calculation equation for the pre-corner section, and the post-corner-section calculating means selects a calculation equation for a post-corner section.

In another wire electric discharge machine according to the invention, the corner-portion speed controlling means includes
a convex-corner-edge-shape determining means that determines, in machining a convex corner along an edge path, whether or not its corner angle is in a predetermined range, and
the machining-volume calculating means selects, in machining the corner-shape portion, a machining volume calculation equation based on a determination result from the convex-corner-edge-shape determining means.

In another wire electric discharge machine according to the invention, information about discharging gaps and machining allowances stored in the corner-control-information storing means is acquired from a predetermined machining-condition-column group.

In another wire electric discharge machine according to the invention, the corner-portion speed controlling means includes
a machining condition storing means that stores a machining condition,
wherein when information about a discharging gap and a machining allowance is not stored in the corner-control-information storing means, the corner-portion speed controlling means calculates the discharging gap value and the machining allowance value based on a machining condition stored in the machining condition storing means.

In another wire electric discharge machine according to the invention, the corner-portion speed controlling means includes
an empty-input alarming means that cautions that information about a discharging gap and a machining allowance is not stored in corner-control-information storing means.

In another wire electric discharge machine according to the invention, the corner-portion speed controlling means includes
a discharging gap table that associates a discharging gap value with the kind of a machining power supply, applying a pulse voltage between a workpiece and the wire electrode, for each cutting operation and electrical conditions set in the machining power supply,
wherein when information about a discharging gap and a machining allowance is not stored in the corner-control-information storing means, the corner-portion speed controlling means refers to the discharging gap table to obtain information about the discharging gap.

A wire electric discharge machining method in which a wire electrode is moved relatively to a workpiece according to a machining program, includes:
a machining-volume calculating step of calculating, according to the machining program, a machining volume during machining a straight-line-shape portion and a machining volume during machining a corner-shape portion; and
a corner-portion-speed calculating step of calculating, based on a calculation result of the machining-volume calculating step, a machining feed speed during machining the corner-shape portion.

Another wire electric discharge machining method according the invention, includes:
a pre-corner-section calculating step of calculating, in machining the straight-line-shape portion, the length of a pre-corner section where the machining quantity per unit moving distance increases or decreases before entering a machining operation of the corner-shape portion;
a post-corner-section calculating step of calculating, in machining the corner-shape portion, the length of a post-corner section where the machining quantity per unit moving distance increases or decreases before entering a machining operation of another straight-line-shape portion; and
a machining-feed-speed controlling step of controlling a machining feed speed from entering the pre-corner section until getting of the post-corner section, based on a calculation result of the corner-portion-speed calculating step, a calculation result of the pre-corner-section calculating step, and a calculation result of the post-corner-section calculating step.

A wire electric discharge machine includes an offset path controlling means that controls an offset path of a wire electrode that is moved relatively to a workpiece at a predetermined machining feed speed, wherein
the offset path controlling means includes
a straight-line-portion-offset-path controlling means that controls an offset path during machining a straight-line-shape portion and
a corner-portion-offset-path controlling means that controls an offset path during machining a corner-shape portion, wherein
the corner-portion-offset-path controlling means includes
a machining-volume calculating means that calculates, according to a machining program, a machining volume during machining the straight-line-shape portion and a machining volume during machining the corner-shape portion, and
a corner-portion-offset-path calculating means that calculates an offset path during machining the corner-shape portion, based on a calculation result of the machining-volume calculating means.

A wire electric discharge machining method for moving a wire electrode relatively to a workpiece at a predetermined machining feed speed, includes:
a machining-volume calculating step of calculating, according to a machining program, a machining volume during machining a straight-line-shape portion and a machining volume during machining a corner-shape portion; and
a corner-portion-offset-path calculating step of calculating, according to a calculation result of the machining-volume calculating step, an offset path during machining the corner-shape portion.

A wire electric discharge machine according to the invention includes a power-supply controlling means that controls an output of a machining power supply applying a pulse voltage between a workpiece and a wire electrode, wherein the power-supply controlling means includes
a straight-line-portion-power-off-interval controlling means that controls power-off intervals of the machining power supply when machining a straight-line-shape portion; and
a corner-portion-power-off-interval controlling means that controls power-off intervals of the machining power supply when machining a corner-shape portion,
wherein the corner-portion-power-off-interval controlling means includes
a machining-volume calculating means that calculates, according to a machining program, a machining volume during machining the straight-line-shape portion and a machining volume during machining the corner-shape portion, and
a corner-portion-power-off-interval calculating means that calculates power-off intervals of the machining power supply when machining the corner-shape portion, based on a calculation result of the machining-volume calculating means.

A wire electric discharge machining method in which a machining power supply applies a pulse voltage between a workpiece and a wire electrode, includes:
a machining-volume calculating step of calculating, according to a machining program, a machining volume during machining a straight-line-shape portion and a machining volume during machining a corner-shape portion; and
a corner-portion-power-off-interval calculating step of calculating, based on a calculation result of the machining-volume calculating step, power-off intervals of the machining power supply during machining the corner-shape portion.

Effect of the Invention

According to the present invention, machining quantities for a straight line portion and a corner portion are estimated as machining volumes, and therefore the precision of the estimation of the machining quantity for the corner portion is improved.

Furthermore, by controlling a machining feed speed, machining power supply's off-intervals, or an offset path at the corner portion based on a volume ratio between the straight line portion and the corner portion, it is possible to equalize machining quantities per unit time between the straight line portion and the corner portion.

Therefore the corner shape accuracy is improved.

BRIEF DESCRIPTION OF DRAWINGS

FIG. 10 is an example of a machining condition table;

Figure 1:
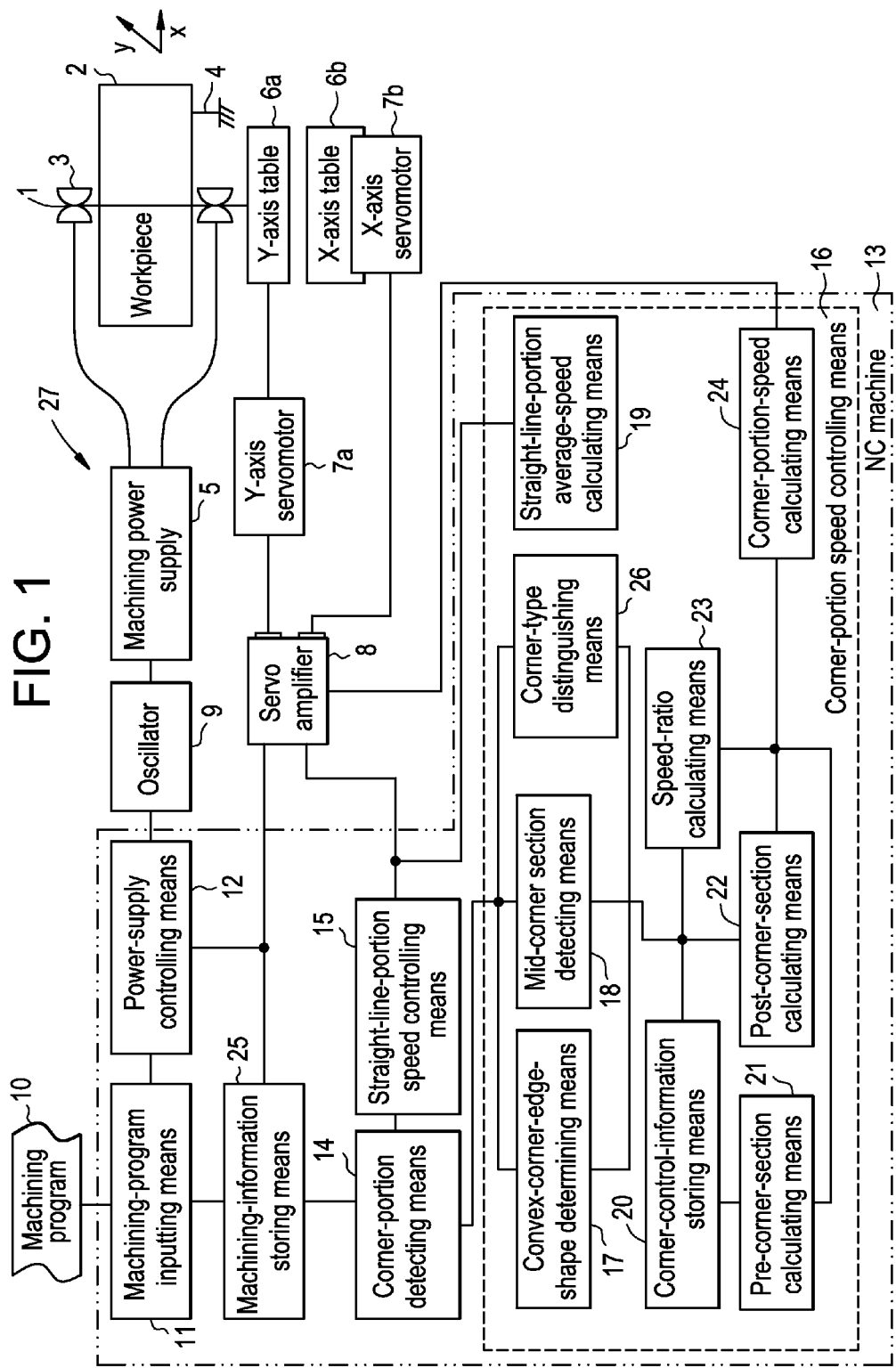
FIG. 1 is a block diagram that shows a configuration of a wire electric discharge machine according to Embodiment 1.

REFERENCE NUMERALS 1 wire electrode
2 workpiece
3 power supplying end
4 ground
5 machining power supply
6a Y-axis table
6b X-axis table
7a Y-axis servomotor
7b X-axis servomotor
8 servo amplifier
9 oscillator
10 machining program
11 machining-program inputting means
12 power-supply controlling means
13 NC machine
14 corner-portion detecting means
15 straight-line-portion speed controlling means
16 corner-portion speed controlling means
17 convex-corner-edge-shape determining means
18 mid-corner section detecting means
19 straight-line-portion average-speed calculating means
20 corner-control-information storing means
21 pre-corner-section calculating means
22 post-corner-section calculating means
23 speed-ratio calculating means
24 corner-portion-speed calculating means
25 machining-information storing means
26 corner-type distinguishing means
27 wire electric discharge machine
28 previous-machining-condition storing means
29 empty-input alarming means
30 discharging gap table
37, 57, 116, 138 pre-corner section
40, 60, 137 mid-corner section
38, 58, 139 post-corner section

BEST MODE FOR CARRYING OUT THE INVENTION

Embodiment 1

A wire electric discharge machine of Embodiment 1 according to the present invention will be explained, using FIGS. 1-11.

FIG. 1 is a block diagram that shows a configuration of the wire electric discharge machine according to Embodiment 1. The wire electric discharge machine 27 includes a wire electrode 1, a pair of power feed contact 3 that are in contact with the wire electrode 1, a machining power supply 5 that outputs pulse currents to the power feed contact 3 according to outputs of an oscillator 9, a Y-axis table 6a and an X-axis table 6b which mount the workpiece 2 thereon and are moved in the Y-axis direction and in the X-axis direction by a Y-axis servomotor 7a and an X-axis servomotor 7b, respectively, a servo amplifier 8 that drives the Y-axis servomotor 7a and the X-axis servomotor 7b, and an NC machine 13 that controls the machining power supply 5 and the servo amplifier 8. Instead of the workpiece 2, the wire electrode 1 can be provided on the Y-axis table 6a and the X-axis table 6b.

With such a configuration being provided, the wire electric discharge machine 27 machines the workpiece 2 by discharging between the wire electrode 1 and the workpiece 2 grounded by a grounding wire 4, while moving the wire electrode 1 relatively to the workpiece 2 at a predetermined speed.

The NC machine 13 controls discharge-machining operations in the wire electric discharge machine 27 and functions according to a machining program 10 stored in advance. The NC machine 13 includes a machining-program inputting means 11, a power-supply controlling means 12, a corner-portion detecting means 14, a straight-line-portion speed controlling means 15 and a corner-portion speed controlling means 16 which are machining-feed-speed controlling means, and a machining-information storing means 25. The corner-portion speed controlling means 16 includes a convex-corner-edge-shape determining means 17, a mid-corner section detecting means 18, a straight-line-portion average-speed calculating means 19, a corner-control-information storing means 20, a pre-corner-section calculating means 21, a post-corner-section calculating means 22, a speed-ratio calculating means 23—a machining-volume calculating means, a corner-portion-speed calculating means 24, and a corner-type distinguishing means 26.

Figure 2:
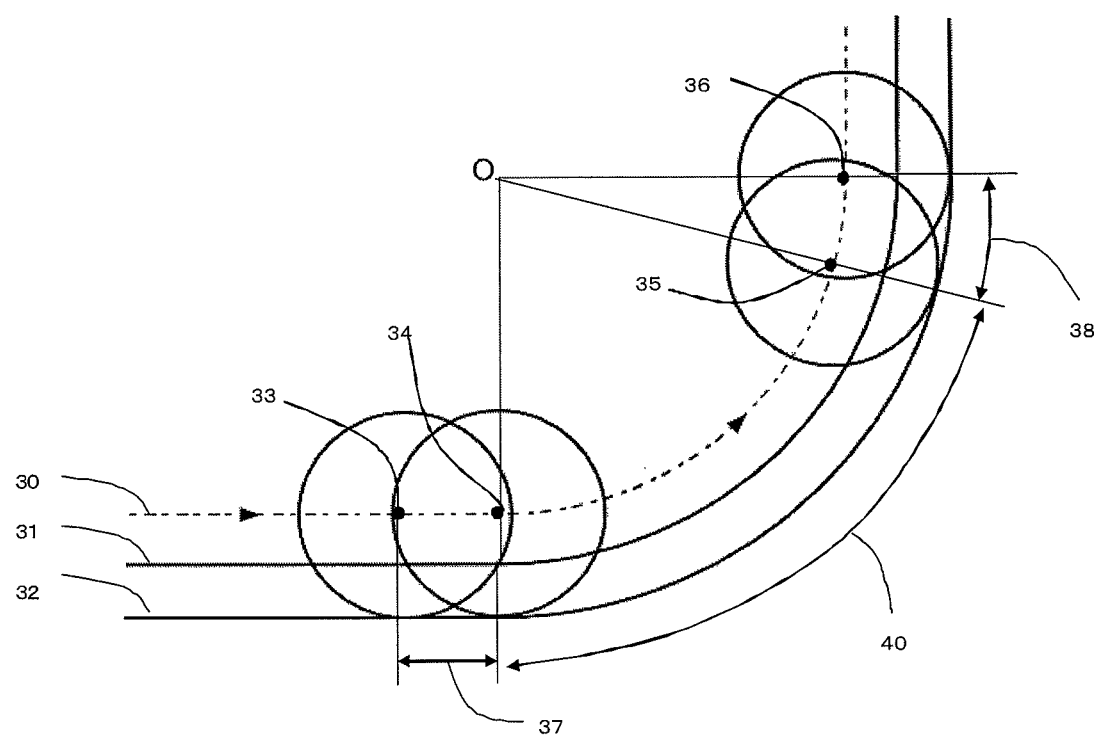
FIG. 2 is a diagram that illustrates a state in which a concave corner of a workpiece is being machined along a circular arc path.

FIG. 2 is a diagram that illustrates a state in which a concave corner of a workpiece is being machined along a circular arc path. In FIG. 2, shown is a state in which a plurality of machining processes (cutting operations) has been performed as skim cuts; a dash and dotted line 30 represents a path (offset path) along which the wire electrode's center moves relatively to the workpiece in the present cutting operation, and arrows represent relative movement directions. A full line 31 represents the workpiece's machining surface by the previous cutting operation, and the full line 32 represents the workpiece's machining surface by the present cutting operation. Respective circles have points 33, 34, 35, 36 as their centers, and each of the circles is a circle (hereinafter, referred to as a discharge circle) having a radius of a discharging gap added to the radius of the wire electrode. A point O is the center of the corner arc.

The point 34 represents a spot where the wire electrode's center enters a corner portion from a straight line portion, and the point 36 represents a spot where the wire electrode's center gets out of the corner portion and enters another straight line portion. When the wire electrode machines the straight line portion, the machining quantity per unit moving distance is constant until the wire electrode's center reaches the point 33. From when the wire electrode's center reaches the point 33 to when reaching the point 34, the machining quantity per unit moving distance increases transitionally. Hereinafter, referred to as "a pre-corner section" is a first section which is a part of the straight line portion and in which the machining quantity per unit moving distance increases or decreases. More specifically, a section represented by a line segment 37 is the pre-corner section which exists between the point 33 and the point 34 and along which the wire electrode's center moves.

After the wire electrode's center reaches the point 34, the machining quantity per unit moving distance does not vary from the machining quantity at the point 34, and remains constant until reaching the point 35. Hereinafter, referred to as "a mid-corner section" is a section which is a part of the corner portion and in which the machining quantity per unit moving distance remains constant.

A line segment 40 is the mid-corner section which exists between the point 34 and the point 35 and along which the wire electrode's center moves. However, when a concave corner is machined along a circular arc path, the mid-corner section may not exist exceptionally, depending on the wire electrode's radius (wire radius), the corner arc's radius, a discharging gap, and a machining allowance. Hereinafter, in machining a concave corner along a circular arc path, a condition for no mid-corner section is referred to as "a singular condition 1". When machining in a singular condition 1, calculation equations for the length of a pre-corner section, the length of a post-corner section, and the machining volume at a corner portion are different from those usually used.

After the wire electrode's center reaches the point 35, the machining quantity per unit moving distance transitionally decreases until the center reaches the point 36. Hereinafter, referred to as "a post-corner section" is a second section which is a part of the corner portion and in which the machining after the mid-corner section machining is performed. More specifically, a section represented by a line segment 38 is the post-corner machining section which exists between the point 35 and the point 36, along which the wire electrode's center moves, and in which the machining quantity per unit moving distance increases or decreases until the center enters another straight line portion.

After the wire electrode's center reaches the point 36, the machining quantity per unit moving distance does not vary from that at the point 36. At this point, the machining quantity at the point 36 becomes equal to that at the point 33.

Figure 3:
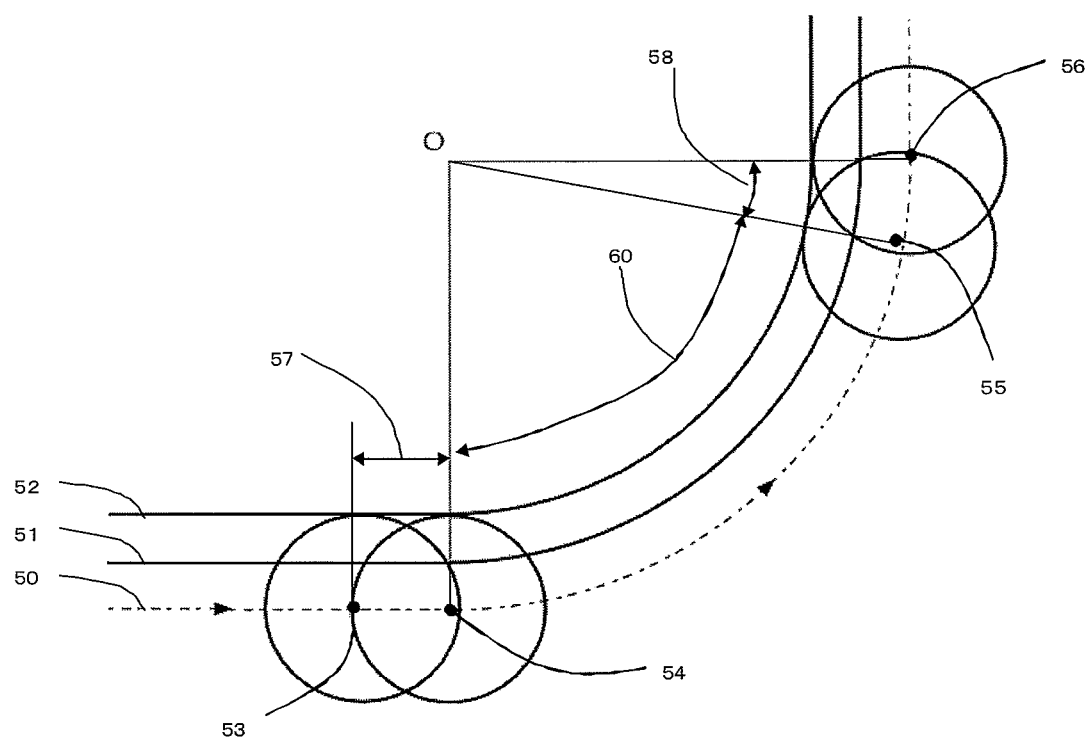
FIG. 3 is a diagram that illustrates a state in which a convex corner of a workpiece is being machined along a circular arc path.

FIG. 3 is a diagram that illustrates a state in which a convex corner of a workpiece is being machined along a circular arc path. A dash and dotted line 50 is an offset path in the current cutting operation, a full line 51 indicates a machining surface of the workpiece by the previous cutting operation, and a full line 52 indicates a machining surface of the workpiece by the current cutting operation. Circles having points 53, 54, 55, and 56 as their center are discharge circles. A point O is the center of a corner arc.

The point 54 indicates a spot at which the wire electrode's center enters a corner portion from a straight line portion, and the point 56 indicates a spot at which the wire electrode's center gets out of the corner portion and enters another straight line portion. Until the center of the wire electrode machining the straight line portion reaches the point 53, the machining quantity per unit moving distance is constant. After the wire electrode center reaches the point 53, the machining quantity per unit moving distance transitionally decreases until the center reaches the point 54. A line segment 57 represents a section between points 53 and 54 along which the wire electrode's center moves, and the line segment is a pre-corner section.

After the wire electrode's center reaches the point 54, the machining quantity per unit moving distance does not vary from that at the point 54 and remains constant until reaching the point 55. A line segment 60 represents a section between the points 54 and 55 along which the wire electrode's center moves, and the line segment is a mid-corner section.

After the wire electrode's center reaches the point 55, the machining quantity per unit moving distance transitionally increases until the wire electrode's center reaches the point 56. A line segment 58 represents a section between the points 55 and 56 along which the wire electrode's center moves, and the line segment is a post-corner section.

After the wire electrode's center reaches the point 56, the machining quantity per unit moving distance does not vary from that at the point 56 and remains constant. The machining quantity at the point 56 becomes equal to that at the point 53.

Figure 4:
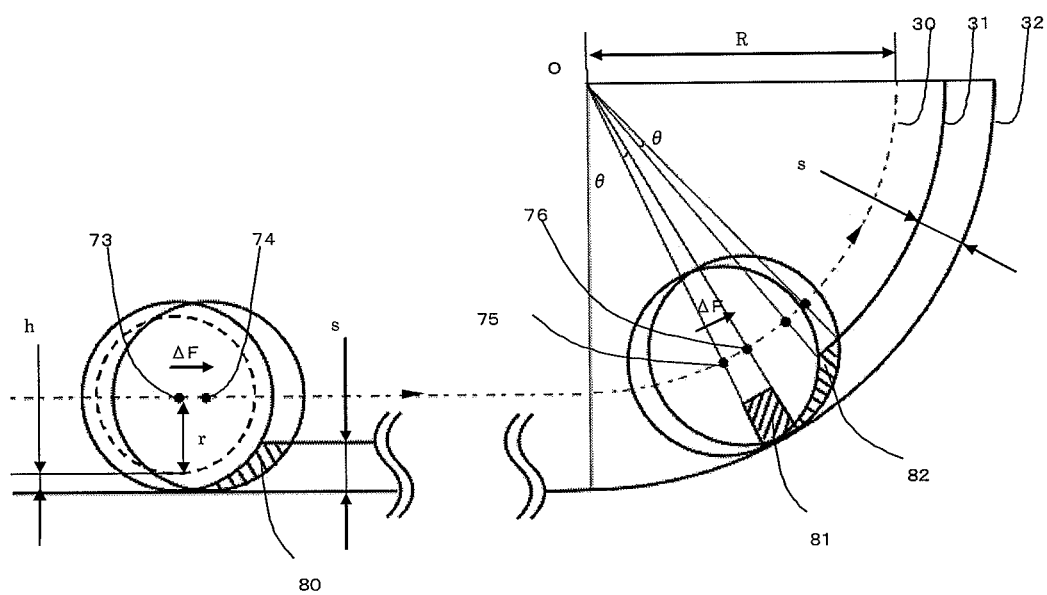
FIG. 4 is a diagram for explaining machining quantities of a straight line portion and a corner portion when a concave corner of a workpiece is machined along a circular arc path.

FIG. 4 is a diagram for explaining machining quantities of a straight line portion and a corner portion when a concave corner of a workpiece is machined along a circular arc path;

Similarly to FIG. 2, a dash and dotted line 30 represents an offset path by the current cutting operation, a full line 31 represents a machining surface of the workpiece by the previous cutting operation, and a full line 32 represents a machining surface of the workpiece by the current cutting operation. When the wire electrode's center is fed in the straight line portion by an infinitesimal distance ΔF—from a point 73 to a point 74, its machining quantity becomes the product of an area illustrated as a hatched region 80 and the thickness of the workpiece. Here, if the area of the hatched region 80 is $V_{st}$ and a machining allowance is s, then the area $V_{st}$ of the hatched region 80 can be obtained by the following equation.

$$V_{st} = \Delta F \cdot s \quad (1)$$

On the other hand, when the wire electrode's center is fed in the corner portion by an infinitesimal distance ΔF—from a point 75 to a point 76, its machining quantity becomes the product of an area illustrated as a hatched region 82 and the thickness of the workpiece. Here, the area indicated as the hatched region 82 is equal to the area indicated as a hatched region 81, which is sandwiched between a straight line passing the corner arc center O and a point 75 and a straight line passing the corner arc center O and a point 76. In the present invention, machining quantity at the corner portion is determined by calculating the area of the hatched region 81, instead of the hatched region 82. If the area of the hatched region 81 is $V_{in\_arc}$, the wire radius is r, the corner radius is R, the discharging gap is h, and the rotation angle around the corner arc center O is θ, then the area $V_{in\_arc}$ of the hatched region 81 can be determined by the following equation.

$$V_{in\_arc} = \frac{1}{2}(R+r+h)^2\theta - \frac{1}{2}(R+r+h-s)^2\theta$$
$$= \frac{1}{2}\theta\{2(R+r+h)s - s^2\}$$

Here, if approximation is made by

ΔF=Rθ then, $$V_{in\_arc} = \frac{1}{2}\frac{\Delta F}{R}\{2(R+r+h)s - s^2\} \quad (2)$$

Figure 5:
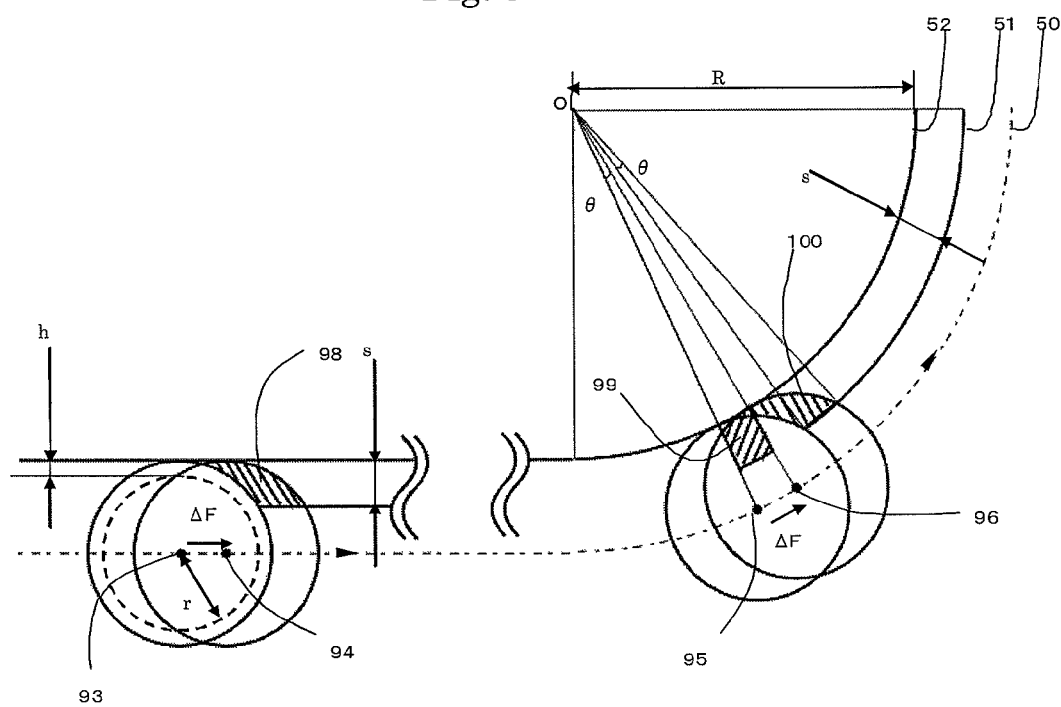
FIG. 5 is a diagram for explaining machining quantities of a straight line portion and a corner portion when a convex corner of a workpiece is machined along a circular arc path.

FIG. 5 is a diagram for explaining machining quantities of a straight line portion and a corner portion when a convex corner of a workpiece is machined along a circular arc path. Similarly to FIG. 3, a dash and dotted line 50 is an offset path in the current cutting operation, a full line 51 indicates a machining surface of the workpiece by the previous cutting operation, and a full line 52 indicates a machining surface of the workpiece by the current cutting operation.

When the wire electrode's center is fed in the straight line portion by an infinitesimal distance ΔF—from a point 93 to a point 94, its machining quantity becomes the product of the area illustrated as a hatched region 98 and the thickness of the workpiece. Here, the area of the hatched region 98 can be determined by using Equation (1).

On the other hand, when the wire electrode's center is fed in the corner portion by an infinitesimal distance ΔF—from a point 95 to a point 96, its machining quantity becomes the product of an area illustrated as a hatched region 100 and the thickness of the workpiece. Here, the area indicated as the hatched region 100 is equal to the area indicated as a hatched region 99, which is sandwiched between a straight line passing the corner arc center O and a point 95 and a straight line passing the corner arc center O and a point 96. In the present invention, machining quantity at the corner portion is determined by calculating the area of the hatched region 99, instead of the hatched region 100. If the area of the hatched region 99 is $V_{out\_arc}$, the machining allowance is s, the wire radius is r, the corner radius is R, the discharging gap is h, and the rotation angle around the corner arc center O is θ, then the area $V_{out\_arc}$ of the hatched region 99 can be determined by the following equation.

$$V_{out\_arc} = \frac{1}{2}(R-r-h+s)^2\theta - \frac{1}{2}(R-r-h)^2\theta$$
$$= \frac{1}{2}\theta\{2(R-r-h)s + s^2\}$$

Here, if approximation is made by

ΔF=Rθ then, $$V_{out\_arc} = \frac{1}{2}\frac{\Delta F}{R}\{2(R-r-h)s + s^2\} \quad (3)$$

Figure 6:
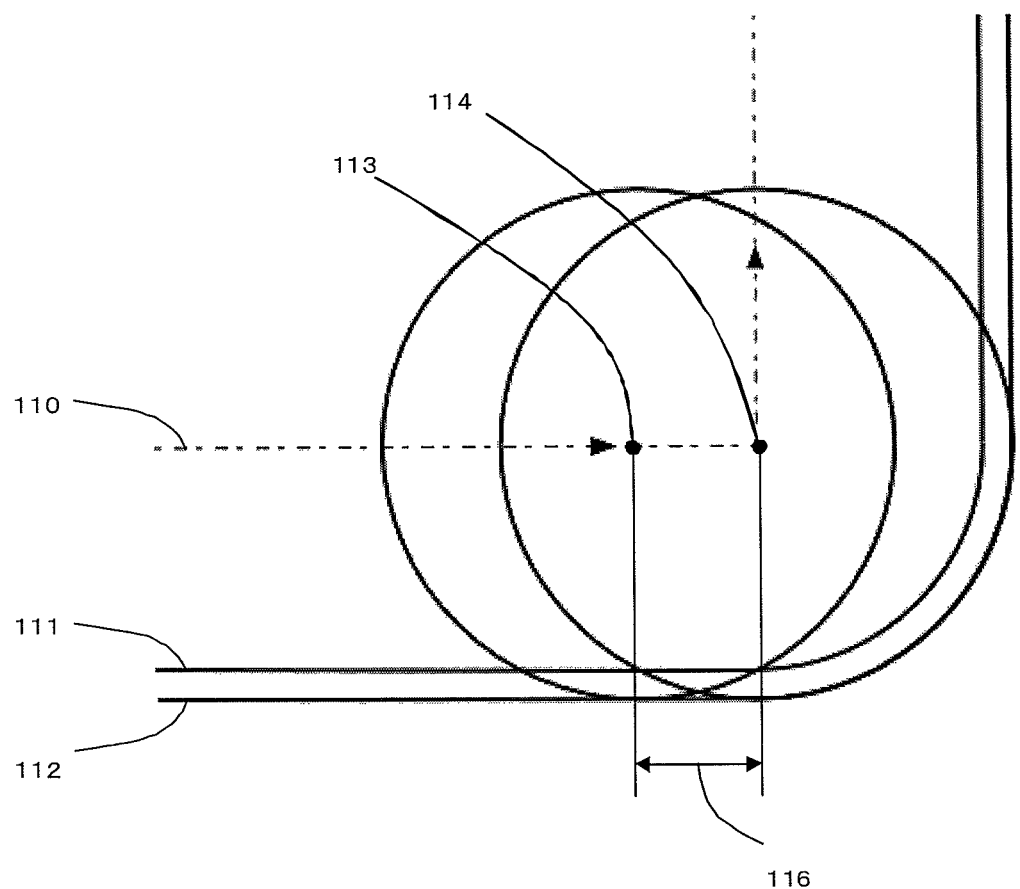
FIG. 6 is a diagram for explaining machining a concave corner of a workpiece along an edge path.

In the above description, explanation has been made for the case of machining a corner portion along a circular arc path. Likewise, explanation will be made for the cases of machining a concave corner and a convex corner along edge trajectories, respectively. FIG. 6 is a diagram for explaining machining a concave corner of a workpiece along an edge path. A dash and dotted line 110 represents an offset path for the current cutting operation, and arrows represent relative movement directions of the wire electrode. A full line 111 indicates a machining surface of the workpiece by the previous cutting operation, and a full line 112 indicates a machining surface of the workpiece by the current cutting operation. Circles having points 113 and 114 as their centers are wire discharge circles.

The point 114 indicates a spot at which the wire electrode's center enters a corner portion from a straight line portion, and in an edge path operation, a corner portion is configured only with the point 114. Until the center of the wire electrode that is machining the straight line portion reaches the point 113, the machining quantity per unit moving distance is constant. After the wire electrode's center reaches the point 113, the machining quantity per unit moving distance transitionally increases until reaching the point 114. A line segment 116 represents a section between points 113 and 114 along which the wire electrode's center moves, and the line segment is a pre-corner section.

When the wire electrode's center reaches the point 114, the machining quantity per unit moving distance discontinuously becomes a value equal to the machining quantity at the point 113 and remains constant thereafter. That is, there exist no mid-corner section and no post-corner section.

Figure 7:
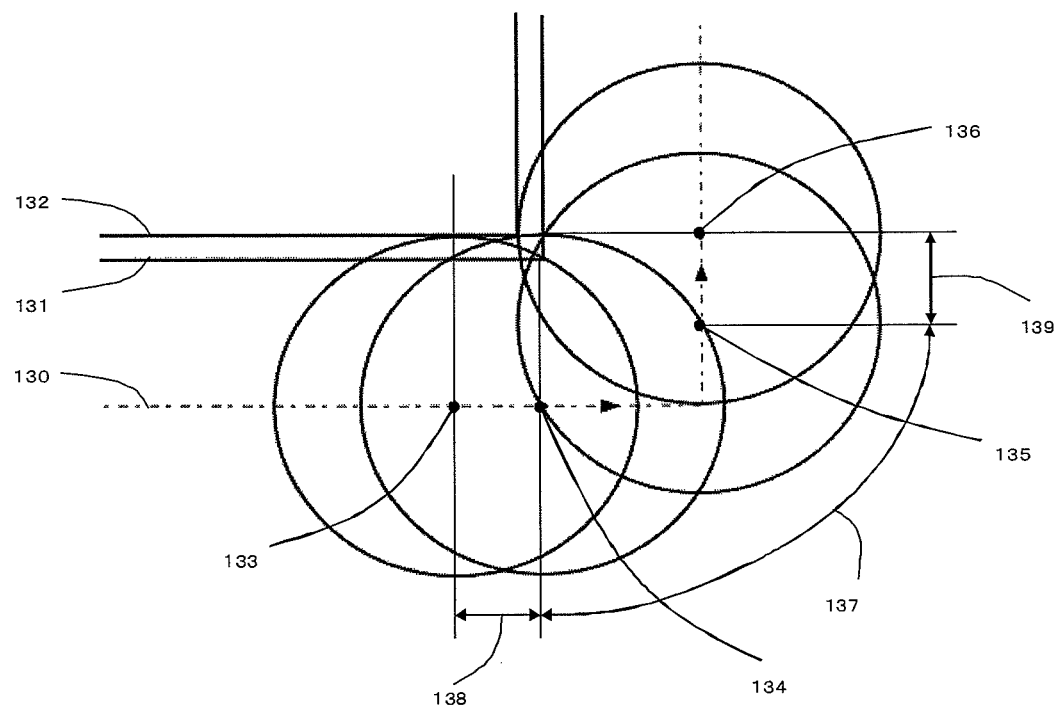
FIG. 7 is a diagram for explaining machining a convex corner of a workpiece along an edge path.

FIG. 7 is a diagram for explaining machining a convex corner of a workpiece along an edge path. A dash and dotted line 130 is an offset path in the current cutting operation, a full line 131 indicates a machining surface of the workpiece by the previous cutting operation, and a full line 132 indicates a machining surface of the workpiece by the current cutting operation. Circles having points 133, 134, 135, and 136 as their centers are wire discharge circles.

The point 134 indicates a spot at which the wire electrode's center enters a corner portion from a straight line portion, and the point 136 indicates a spot at which the wire electrode's center gets out of the corner portion and enters another straight line portion. Until the center of the wire electrode that is machining the straight line portion reaches the point 133, the machining quantity per unit moving distance is constant. After the wire electrode's center reaches the point 133, the machining quantity per unit moving distance transitionally decreases and becomes zero at the point 134. A line segment 138 represents a section between points 133 and 134 along which the wire electrode's center moves, and the line segment is a pre-corner section.

After the wire electrode's center reaches the point 134, the machining quantity remains zero until the electrode's center reaches the point 135. A line segment 137 represents a section between the points 134 and 135 along which the wire electrode's center moves, and the line segment is a mid-corner section. This mid-corner section 137 becomes a section that is not machined.

After the wire electrode's center reaches the point 135, the machining quantity per unit moving distance transitionally increases until reaching the point 136. A line segment 139 represents a section between the points 135 and 136 along which the wire electrode's center moves, and the line segment is a post-corner section.

After the wire electrode's center reaches the point 136, the machining quantity per unit moving distance does not vary from that at the point 136 and remains constant. And then, the machining quantity at the point 136 becomes the same quantity as that at the point 133.

Figure 8:
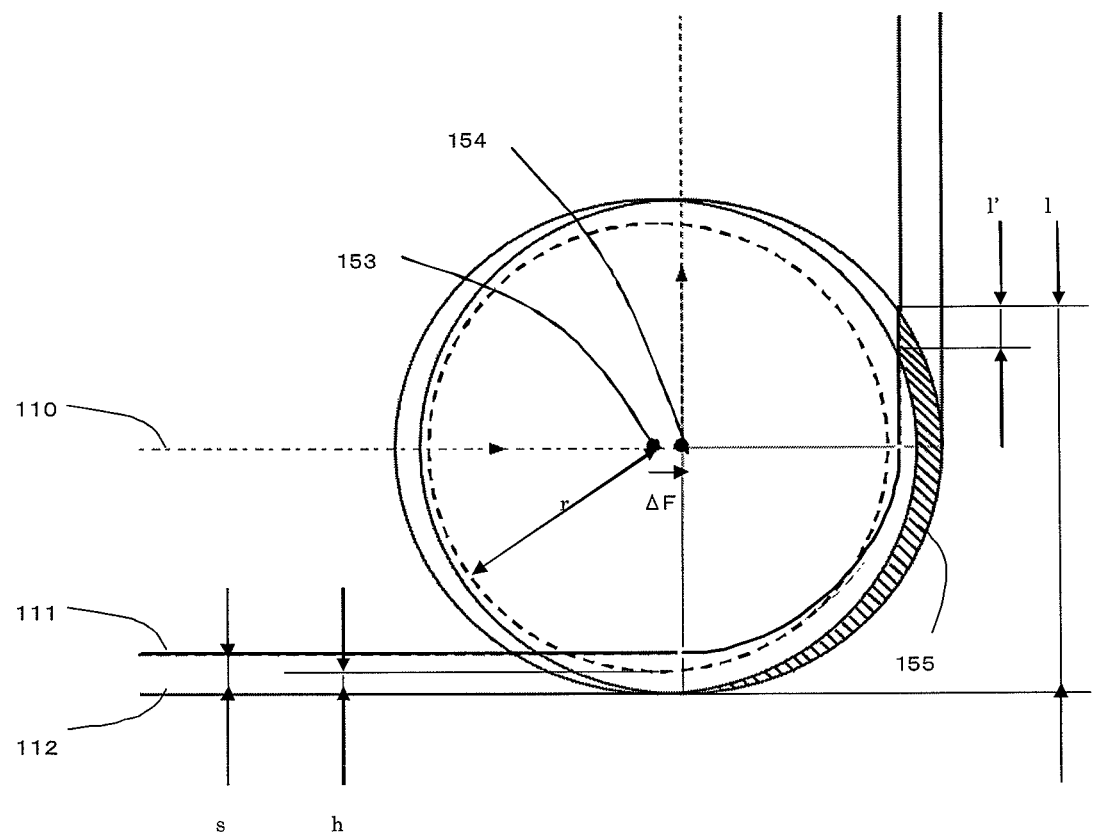
FIG. 8 is a diagram for explaining machining quantities of a corner portion when a concave corner of a workpiece is machined along an edge path.

FIG. 8 is a diagram for explaining machining quantities of a corner portion when a concave corner of a workpiece is machined along an edge path. Similarly to FIG. 6, a dash and dotted line 110 is an offset path in the current cutting operation, a full line 111 indicates a machining surface of the workpiece by the previous cutting operation, and a full line 112 indicates a machining surface of the workpiece by the current cutting operation. When the wire electrode's center is fed in the corner portion by an infinitesimal distance $\Delta F$—from a point 153 to a point 154, its machining quantity becomes the product of an area illustrated as a hatched region 155 and the thickness of the workpiece. When a concave corner is machined along an edge path, there exists no mid-corner section. Therefore, the machining quantity takes its maximum value when the wire electrode comes to a vertex 154 of the corner portion. If the area of the hatched region 155 is $V_{in\_edge}$, a machining allowance is s, the wire radius is r, the corner radius is R, the discharging gap is h, the length of a line segment that connects between the point where the wire discharge circle having its center at the point 153 crosses the offset path 111 at the corner exit and the point where the wire discharge circle having its center at the point 154 crosses the offset path 112 at the corner exit, is l', and the distance between the point where the wire discharge circle having its center at the point 153 crosses the offset path 111 at the corner exit and the extension of the offset path 112 at the corner entrance, is l, then the area $V_{in\_edge}$ of the hatched region 155 can be approximated by the following equation.

$$V_{in\_edge} = \Delta F \cdot l$$

where $$l = l' + R + r + h$$

and $$l' = \sqrt{(s-R)(R+2r+2h-s)} - R$$

then, $$V_{in\_edge} = \Delta F \cdot \{\sqrt{(s-R)(R+2r+2h-s)} - R\} \quad (4)$$

here, R=0.

On the other hand, a machining quantity at a corner portion is not illustrated when a convex corner is machined along an edge path, because its quantity is zero as described above.

In addition, in an exceptional case where a convex corner is machined along an edge path with the corner angle being significantly large or small, the definition of its pre-corner section or post-corner section is different from that of regular cases. In machining a convex corner along an edge path, when pre- and post-corner section definitions are different from those defined for regular cases in which the corner angle is within a predetermined range, its corner condition is referred to "a singular condition 2". In the singular condition 2, the calculation equation of the corner portion's machining volume is different from that regularly used.

In addition, definitions that have been described for the pre-corner section, the mid-corner section, and the post-corner section can be used for any corner angle except for angles corresponding to the singular condition 1 and the singular condition 2.

Figure 9:
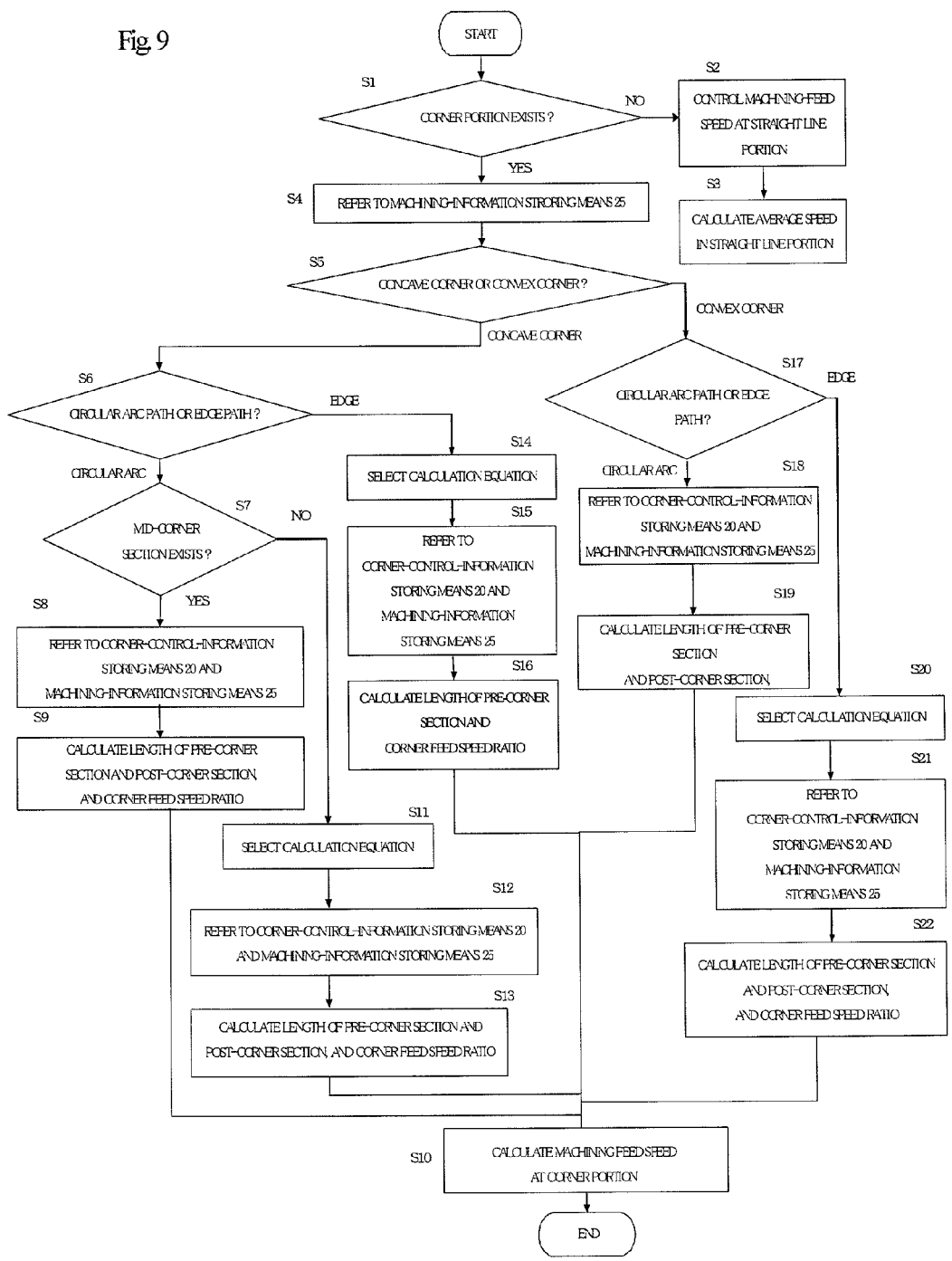
FIG. 9 is a flow chart that shows operations of a corner-portion controlling means 16.

Next, operations according to Embodiment 1 will be explained using FIG. 1 and FIG. 9. FIG. 9 is a flow chart that shows operations of a corner-portion controlling means 16. By the machining-program inputting means 11, the machining program 10 is inputted to the NC machine 13 in advance. The machining-information storing means 25 stores the machining program 10 inputted by the machining-program inputting means 11. The machining-information storing means 25 also stores, in advance, information about target shape, offset, corner radius, wire radius, discharging gap, and machining allowance which are necessary to control machining-feed speed at straight line portions and corner portions. On the other hand, the corner-control-information storing means 20 stores, in advance, information about discharging gap and machining allowance that are necessary for controlling machining-feed speed at corner portions.

According to the machining program 10 inputted by the machining-program inputting means 11, the power-supply controlling means 12 controls the oscillator 9 and the machining power supply 5. By these controlled operations, pulse voltages are applied through the power feed contact 3 between the wire electrode 1 and the workpiece 2. On the other hand, according to the machining program 10 inputted by the machining-program inputting means 11, the corner-portion detecting means 14 continually looks ahead (Step S1) to find out whether or not a corner portion exits a predetermined distance ahead in a machining direction from the center of the wire electrode 1. The predetermined distance applied to the look ahead operation is set to be sufficiently longer than the length of a pre-corner section regularly expected.

During a period when the corner-portion detecting means 14 does not detect a corner portion, the machining-feed speed is controlled for a straight line portion (Step S2). That is, the straight-line-portion speed controlling means 15 continually outputs machining feed speed instructions with respect to the straight line portion. The servo amplifier 8 drives the Y-axis servomotor 7*a* and the X-axis servomotor 7*b* according to the machining feed speed instructions with respect to the straight line portion outputted by the straight-line-portion speed controlling means 15 and machining path data of the machining program 10 stored in the machining-information storing means 25. By these operations, the Y-axis table 6*a* and the X-axis table 6*b* are moved, and the wire electrode 1 is moved relatively to the workpiece 2. The straight-line-portion average-speed calculating means 19 continually stores machining feed speed instructions with respect to the straight line portion outputted by the straight-line-portion speed controlling means 15, and calculates (Step S3) and stores, at every predetermined time, the average machining feed speed with respect to the straight line portion (hereinafter, referred to as straight-line-portion average speed).

On the other hand, when the corner-portion detecting means 14 detects a corner portion, the corner-portion detecting means 14 outputs information about a path of the corner portion (hereinafter, referred to as corner-portion detection information). Based on the corner-portion detection information outputted by the corner-portion detecting means 14 and information about a target shape and an offset stored in the machining-information storing means 25 (Step S4), the corner-type distinguishing means 26 determines whether the corner portion is a concave corner or a convex corner (Step S5).

If the corner portion is a concave corner, the corner-type distinguishing means 26 determines whether the corner portion is machined along a circular arc path or an edge path (Step S6). When determined to machine along a circular arc path, the mid-corner section detecting means 18 determines, according to corner detection information outputted by the corner-portion detecting means 14, whether or not a mid-corner section exists (Step S7). No mid-corner section means the case that meets the singular condition 1, and the mid-corner section detecting means 18 determines at Step S7 whether or not the case meets the singular condition 1. When a mid-corner section exists, the pre-corner-section calculating means 21, the post-corner-section calculating means 22, and the speed-ratio calculating means 23 refer to information about a corner radius and a wire radius stored in the machining-information storing means 25 and information about a discharging gap and a machining allowance stored in the corner-control-information storing means 20 (Step S8). Then, the pre-corner-section calculating means 21 and the post-corner-section calculating means 22 calculate the lengths of the pre-corner section and the post-corner section, respectively. The speed-ratio calculating means 23 calculates the respective machining volumes of its straight line portion and corner portion, and then calculates a machining volume ratio between the straight line portion and the corner portion ((the machining volume of the corner portion)/(the machining volume of the straight line portion)) (Step S9). Here, the machining volume of the mid-corner section is calculated as that of the corner portion. In this embodiment, machining quantity is calculated in machining volume. Furthermore, the inverse of the machining volume ratio between the straight line portion and corner portion ((the machining volume of the straight line portion/(the machining volume of the corner portion)) is treated as a machining feed speed ratio between the straight line portion and corner portion (hereinafter, referred to as a machining speed ratio). This is for making the machining feed speed inversely proportional to the machining volume.

Next, the corner-portion-speed calculating means 24 obtains a straight-line-portion average speed stored in the straight-line-portion average-speed calculating means 19 just before the wire electrode 1 enters the pre-corner section, to calculate a machining feed speed at the corner portion (Step S10) by multiplying the average speed by a machining speed ratio outputted from the speed-ratio calculating means 23. Then, based on the length of the pre-corner section outputted by the pre-corner-section calculating means 21 and the length of the post-corner section outputted by the post-corner-section calculating means 22, the corner-portion-speed calculating means outputs to the servo amplifier 8, instructions about machining feed speeds from entering the pre-corner section till getting out of the post-corner section (hereinafter, referred to as corner-portion-machining-feed-speed instructions). For example, the corner-portion-machining-feed-speed instructions are outputted so that the pre-corner section's machining feed speed transitionally varies from that in the straight line portion to that in the corner portion, the mid-corner section's machining feed speed is maintained to be the machining feed speed at the corner portion, and the post-corner section's machining feed speed transitionally varies from that in the corner portion to that in another straight line portion.

Then, the servo amplifier 8 drives the Y-axis servomotor 7*a* and the X-axis servomotor 7*b* according to the corner-portion-machining-feed-speed instructions outputted by the corner-portion-speed calculating means 24 and a machining path of the machining program 10 outputted from the machining-information storing means 25. By these operations, the Y-axis table 6*a* and the X-axis table 6*b* are moved so as to move the wire electrode 1 relatively to the workpiece 2.

On the other hand, if there is no mid-corner section, the mid-corner section detecting means 18 selects calculation equations (Step S11) for the pre-corner section's length, the post-corner section's length, the straight line portion's machining volume and the corner portion's machining volume that meet the singular condition 1. Next, the pre-corner-section calculating means 21, the post-corner-section calculating means 22, and the speed-ratio calculating means 23 refer to information about a corner radius and a wire radius stored in the machining-information storing means 25 and information about a discharging gap and a machining allowance stored in the corner-control-information storing means 20 (Step S12). Then, the pre-corner-section calculating means 21 and the post-corner-section calculating means 22 calculate the lengths of the pre-corner section and the post-corner section, respectively, and the speed-ratio calculating means 23 calculates a machining speed ratio (Step S13) to proceed to Step S10. Here, as the corner portion's machining volume to be used for machining speed ratio calculation, a machining volume at the spot where the pre-corner section changes into the post-corner section is calculated.

On the other hand, if machined along an edge path, the corner-type distinguishing means 26 selects appropriate calculation equations (Step S14) for the pre-corner section's length, the straight line portion's machining volume and the corner portion's machining volume. Next, the pre-corner-section calculating means 21, and the speed-ratio calculating means 23 refer to information about a corner radius and a wire radius stored in the machining-information storing means 25 and information about a discharging gap and a machining allowance stored in the corner-control-information storing means 20 (Step S15). Then, the pre-corner-section calculating means 21 calculated the length of the pre-corner section, and the speed-ratio calculating means 23 calculates a machining speed ratio (Step S16) to proceed to Step S10. Here, as the corner portion's machining volume to be used for machining speed ratio calculation, a machining volume at the spot where the pre-corner section changes into another straight line portion is calculated.

On the other hand, if the corner portion is a convex corner, the corner-type distinguishing means 26 determines whether the corner portion is machined along a circular arc path or an edge path (Step S17). If machined along a circular arc path, the pre-corner-section calculating means 21, the post-corner-section calculating means 22, and the speed-ratio calculating means 23 refer to information about a corner radius and a wire radius stored in the machining-information storing means 25 and information about a discharging gap and a machining allowance stored in the corner-control-information storing means 20 (Step S18).

Then, the pre-corner-section calculating means 21 and the post-corner-section calculating means 22 calculate the lengths of the pre-corner section and the post-corner section, respectively, and the speed-ratio calculating means 23 calculates a machining speed ratio (Step S19) to proceed to Step S10. Here, as the corner portion's machining volume, a machining volume of the mid-corner section is calculated.

On the other hand, if machined along an edge path, the convex-corner-edge-shape determining means 17 determines, according to the corner-portion detection information outputted from the corner-portion detecting means 14, whether or not the case meets the singular condition 2. Then, according to the determined result, the convex-corner-edge-shape determining means selects calculation equations for machining volumes of the straight line portion and the corner portion (Step S20). Next, the pre-corner-section calculating means 21, the post-corner-section calculating means 22, and the speed-ratio calculating means 23 refer to information about a corner radius and a wire radius stored in the machining-information storing means 25 and information about a discharging gap and a machining allowance stored in the corner-control-information storing means 20 (Step S21). Then, the pre-corner-section calculating means 21 and the post-corner-section calculating means 22 calculate the lengths of the pre-corner section and the post-corner section, respectively, and the speed-ratio calculating means 23 calculates a machining speed ratio (Step S22) to proceed to Step S10. In this case, as have been explained, the machining volume of the mid-corner section becomes zero. Therefore, if the real machining volume of the mid-corner section is used, the machining speed ratio becomes infinite. In order to solve this problem, a measure can be taken to make a machining speed ratio a finite value, in which instead of the real machining volume of the mid-corner section, a predetermined value is set in advance as the corner portion's machining volume or a calculation equation is set in advance according to its edge shape or the like.

Furthermore, another measure may taken in which a predetermined value set in advance as the corner portion's machining feed speed is used with Step S20 being skipped.

Although users' desired specification information about target shape, corner radius, and wire radius is in advance inputted in the machining-information storing means 25, information about offsets is determined by those of a machining-condition-column group that the user selected from a machining condition table. FIG. 10 is an example of a machining condition table. A machining condition table is a table including a plurality of machining-condition-column groups each of which regularly includes individual information according to workpiece's material and thickness, wire radius, and required accuracy (the number of finishing) that are provided by the manufacturer of the wire electric discharge machine. Machining condition means an electrical condition and an offset condition that are necessary for wire electric discharge machining. Each of machining-condition-column groups is optimized according to a desired machining performance such as surface roughness, straightness, and machining feed speed. In a regular case, by selecting a machining-condition-column group, the user sets a series of machining conditions from the first rough machining to the last finish machining.

Figure 11:
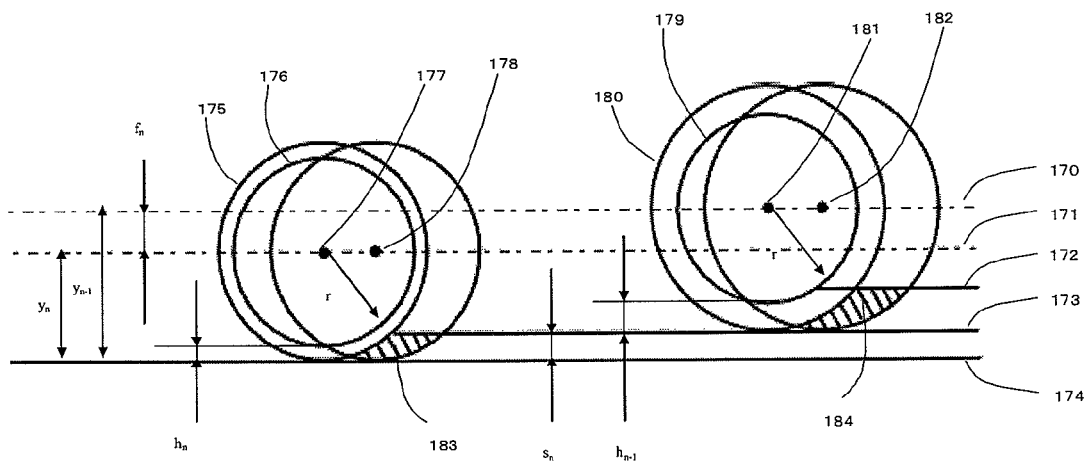
FIG. 11 is a diagram that illustrates parameters necessary for calculating a machining allowance.

On the other hand, information about discharging gap to be stored in advance in the corner-control-information storing means 20 is obtained from a machining-condition-column group; however information about machining allowance is obtained by getting necessary parameters from the machining-condition-column group to calculate thereof. FIG. 11 is a diagram that illustrates parameters necessary for calculating a machining allowance. A dash and dotted line 170 is an offset path by the n−1th cutting operation; a dash and dotted line 171, an offset path by the nth cutting operation; a full line 172, a machining surface of the workpiece by the n−2th cutting operation; a full line 173, a machining surface of the workpiece by the n−1th cutting operation; a full line 174, a machining surface of the workpiece by the nth cutting operation; a circle 175, a discharge circle with the wire electrode's center being at a point 177 and its radius being that of the wire electrode 176 plus a discharging gap; a hatched region 183, a machined portion when the wire electrode's center moves relatively from the point 177 to a point 178; a circle 180, a discharge circle with the wire electrode's center being at a point 181 and its radius being that of the wire electrode 179 plus a discharging gap; a hatched region 184, a machined portion when the wire electrode's center moves relatively from the point 181 to a point 182. In addition, in the figure, a symbol r denotes a wire radius; a symbol $y_{n-1}$, an offset at the n−1th cutting operation; a symbol $y_n$, an offset at the nth cutting operation; a symbol $f_n$, an approaching quantity at the nth cutting operation; a symbol $h_{n-1}$, a discharging gap for the n−1th cutting operation; a symbol $h_n$, a discharging gap for the nth cutting operation; a symbol $s_n$, a machining allowance at the nth cutting operation.

The offset $y_{n-1}$ at the n−1th cutting operation and the offset and the offset $y_n$ at the nth cutting operation are calculated Equations (5) and (6), respectively.

$$y_{n-1} = r + h_{n-1} + s_n \tag{5}$$

$$y_n = r + h_n \tag{6}$$

As transformed from these two equations, the machining allowance $s_n$ at the nth cutting operation can be obtained as follows.

$$s_n = y_{n-1} - y_n + h_n - h_{n-1} \tag{7}$$

Here, using the following equation, $$y_{n-1} - y_n = f_n$$

then, $$s_n = f_n + h_n - h_{n-1} \tag{8}$$

can be obtained.

That is, as indicated by Equation (8), the machining allowance is a summation of the approaching quantity and the difference between discharging gaps of the present cutting operation and the previous one.

In this embodiment, it has been described that the corner-portion speed controlling means includes a corner-portion-speed means that calculates a machining feed speed at a corner portion based on a calculation result from a speed-ratio calculating means—a machining-volume calculating means; however, how to equalize the machining quantities per unit time between a straight line portion and corner portion is not limited to the method using the above means. Instead of the method using the corner-portion speed controlling means and the corner-portion-speed calculating means, another method may be applicable with such a configuration that the power-supply controlling means controlling machining power supply's outputs is provided with a corner-portion-power-off-interval calculating means that calculates power-off intervals at a corner portion based on a calculation result from the machining-volume calculating means. Otherwise, an offset path controlling means that is connected to the servo amplifier to control an offset path may be provided with a corner-portion-offset-path calculating means that calculates the offset path at a corner portion based on a calculation result from the machining-volume calculating means. Furthermore, a combination of methods described above may be applicable.

In this embodiment, the machining feed speed at a corner portion is calculated based on the straight-line-portion average speed and machining volumes of the straight line portion and the corner portion; however, in this calculation, it would be sufficient that machining quantities of the straight line portion and the corner portion be almost equal, and they may differ a little.

According to Embodiment 1, because machining quantities of the straight line portion and the corner portion are estimated as machining volumes, they can be estimated more accurately than those conventionally estimated. Furthermore, the machining quantities per unit time can be made equal between the straight line portion and the corner portion, by controlling the machining feed speed, the power-off intervals of the machining power supply, or the offset path at the corner portion according to the volume ratio between the straight line portion and the corner portion. This can improve the corner shape accuracy.

Embodiment 2

A wire electric discharge machine of Embodiment 2 according to the present invention will be explained referring to FIG. 12.

In Embodiment 1, necessary parameters are obtained from those in machining-condition-column groups of the machining condition table provided by the manufacturer of the wire electric discharge machine to calculate machining allowance values to be stored in advance in the corner-control-information storing means 20. However, the machining condition table provided by the manufacturer sometimes does not include a machining-condition-column group that meets a machining condition which the user of the wire electric discharge machine requires.

An example of such cases will be explained referring to a machining condition table shown in FIG. 10. It is assumed that till the n−1th cutting operation—the previous cutting, machining operations have been performed in machining conditions indicated by machining condition names $E\_A_{n-2}$ and $E\_A_{n-1}$ according to a machining-condition-column group A. Then, it is also assumed that at the nth cutting operation—the current operation, the user tries to machine under a machining condition indicated by a machining condition name $E\_B_n$ in a machining-condition-column group B.

If the user simply replaces the machining-condition-column group A with the machining-condition-column group B, a machining allowance $s_n$ at the nth cutting operation is calculated by the Equation (7) to become as the following.

$$s_n = y\_B_{n-1} - y\_B_n + h\_B_n - h\_B_{n-1}$$

Then, a machining allowance value different from the actual one would be stored in the corner-control-information storing means 20. If a machining-feed-speed control operation is performed at the corner portion according to a machining allowance value different from an actual one, its corner shape accuracy would not be improved.

Figure 12:
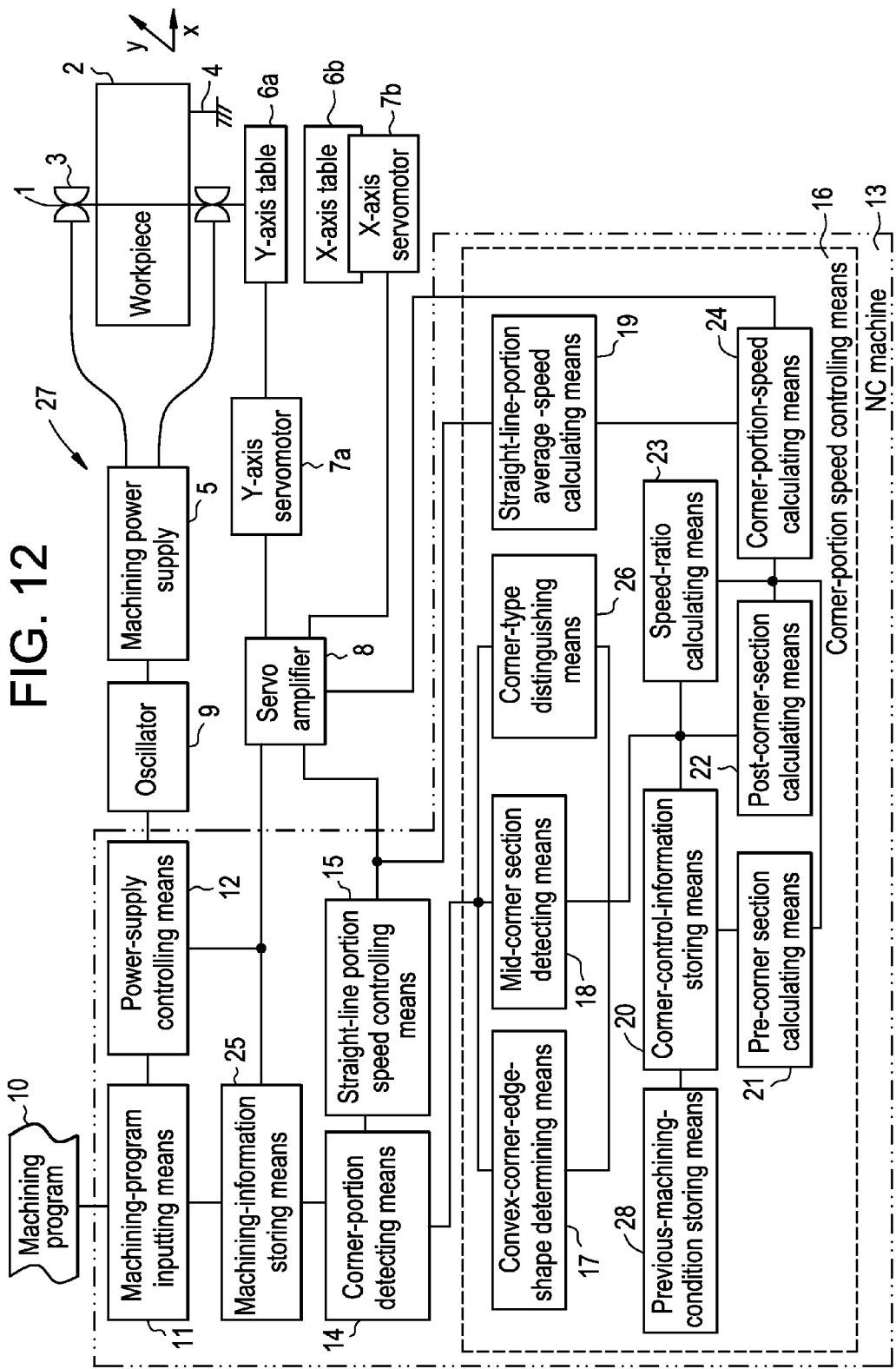
FIG. 12 is a block diagram that shows a configuration of a wire electric discharge machine according to Embodiment 2.

FIG. 12 is a block diagram that shows a configuration of a wire electric discharge machine according to Embodiment 2. In the figure, constituent parts that are equivalent or identical to those in FIG. 1 are designated as the same reference numerals and symbols to omit their detailed explanations. In Embodiment 2, the corner-portion speed controlling means 16 is provided with a previous-machining-condition storing means 28 that is a machining condition storing means to store the previous machining condition in the previous machining operation. With this configuration, when modifying in a machining operation its machining condition or when going to machine without complying the machining condition, the actual machining allowance can be calculated using the current machining condition and the previous machining condition stored in the previous-machining-condition storing means. The calculated actual machining allowance is stored in the corner-control-information storing means 20.

Therefore, in the example described above, because the machining-condition-column group A is used until the previous cutting operation, an actual machining allowance $s_n$ represented by Equation (9) can be determined.

$$s_n = y\_A_{n-1} - y\_B_n + h\_B_n - h\_A_{n-1} \qquad (9)$$

In addition, such a machining condition storing means is not limited to the machining condition storing means 28 which stores only the previous machining condition, and may store the machining conditions from, for example, the first machining to the previous or last one.

According to Embodiment 2, because the previous machining condition is stored, it is possible to calculate an actual machining allowance by the Equation (9). Thus, even when machining operations are performed without complying with the machining-condition-column group provided by the wire electric discharge machine manufacture, it is possible to perform a machining-feed-speed control at a corner portion as equivalent to that of Embodiment 1. Then, this operation realizes a corner shape accuracy equivalent to that by Embodiment 1.

Embodiment 3

A wire electric discharge machine of Embodiment 3 according to the present invention will be explained, referring to FIG. 13.

A user of the wire electric discharge machine sometimes modifies the machining conditions in the machining condition table provided by the manufacturer or prepares a machining condition by him/herself, to thereby machine a workpiece. If machining operation is performed under a modified machining condition, the machining allowance stored in the corner-control-information storing means 20 is different from the actual one, which cannot improve its corner shape accuracy. When a machining condition is prepared by him/herself, information about discharging gaps and machining allowances is not stored in the corner-control-information storing means 20. Therefore, it is impossible to perform a machining-feed-speed control at a corner portion described in Embodiment 1.

A general method to obtain a discharging gap value in a modified or self-made machining condition is to measure the gap value in a sample figure actually machined according to the modified or self-made machining condition. In order to obtain a machining allowance, it is necessary to calculate it using the discharging gap and Equation (7). However, there needs a lot of time and work for obtaining information about a discharging gap and machining allowance through this method.

Figure 13:
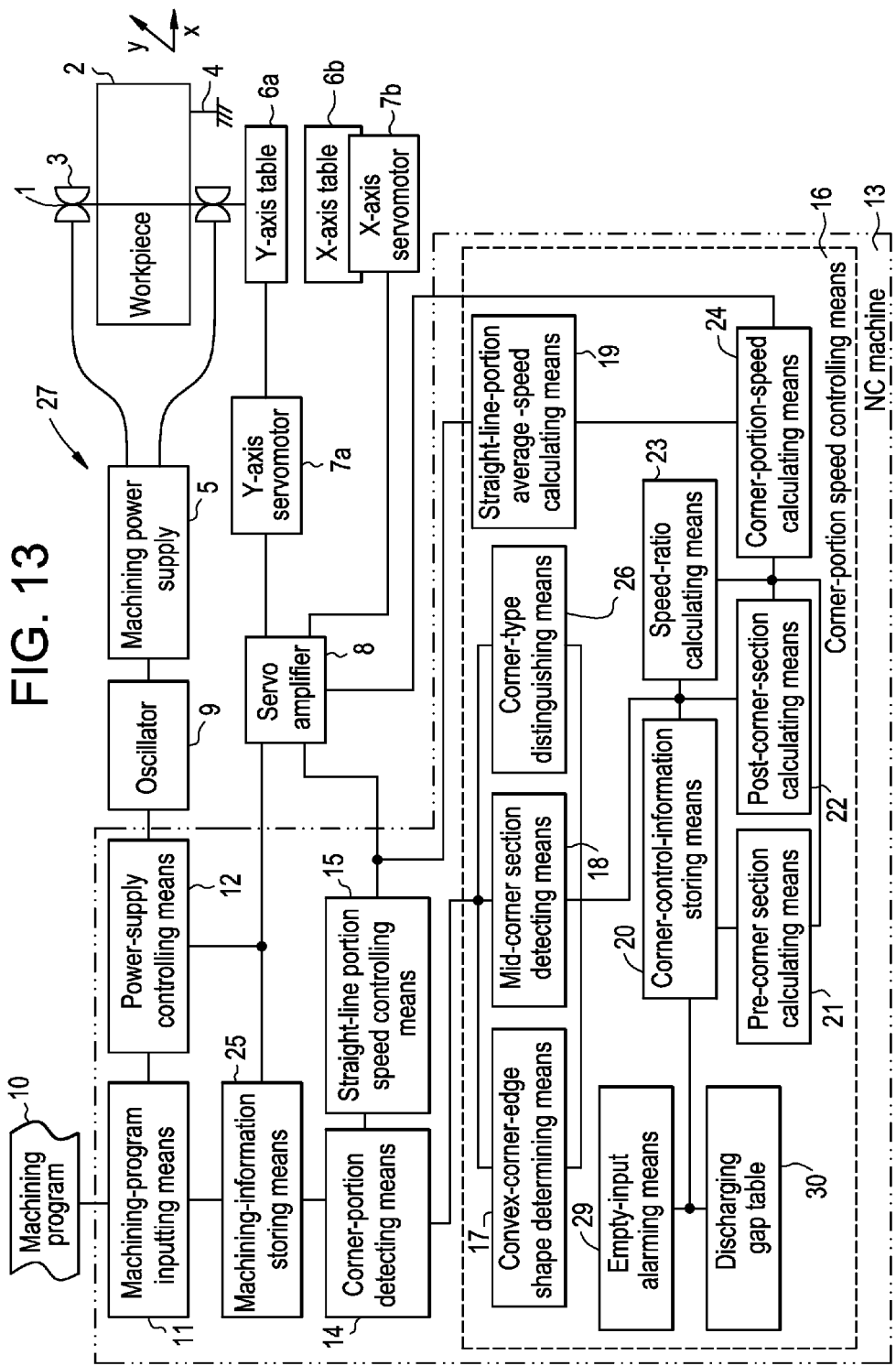
FIG. 13 is a block diagram that shows a configuration of a wire electric discharge machine according to Embodiment 3.

FIG. 13 is a block diagram that shows a configuration of a wire electric discharge machine according to Embodiment 3. In the figure, constituent parts that are equivalent or identical to those in FIG. 1 are designated as the same reference numerals and symbols to omit their detailed explanations. In Embodiment 3, the corner-portion speed controlling means 16 is provided with an empty-input alarming means 29 that cautions the user when a discharging gap or machining allowance is not inputted. The corner-portion speed controlling means 16 is also provided with a discharging gap table 30 to obtain a discharging gap value. In a wire electric discharge machine, a machining power supply is regularly used in which electrical conditions, such as current peak and discharge frequency, are differently set for respective cutting operations. The discharging gap table 30 is used to associate kinds of machining power supply for respective cuttings, electrical conditions set in the machining power supply, and discharging gap values with each other.

Next, the operations of this embodiment will be explained. When a machining condition is modified or produced by the user, the empty-input alarming means 29 cautions the user. If the user knows, at that time, information about a discharging gap and machining allowance in the machining condition modified or produced by the user, the user inputs information about the discharging gap and machining allowance into the corner-control-information storing means 20 inputs.

On the other hand, if the user does not know information about the discharging gap and machining allowance, the corner-control-information storing means 20 obtains the discharging gap value from the discharging gap table 30 to calculate a machining allowance value with the discharging gap value and Equation (7). Then, the information obtained about the discharging gap and machining allowance is inputted to the corner-control-information storing means 20.

In addition, there is also a method for obtaining a discharging gap value, in which the discharging gap value is obtained from, for example, the current machining feed speed and the average voltage between electrodes. In this case, a discharging gap detection means, not shown in the figure, may be provided instead of the discharging gap table 30.

In Embodiment 3, if information about the discharging gap and machining allowance is not stored in the corner-control-information storing means, warnings are issued. Therefore, the input operation of the information about the discharging gap and machining allowance is ensured. Furthermore, even if the user does not know information about the discharging gap and machining allowance, the corner-control means is capable of obtaining information about the discharging gap and allowance to perform a machining-feed-speed control at the corner portion equivalently to Embodiment 1. By these operations, the corner shape accuracy can be as good as in Embodiment 1.

The invention claimed is:

1. A wire electric discharge machine that applies a predetermined pulse voltage between a wire electrode and a workpiece, while moving the wire electrode relatively to the workpiece along a path programmed beforehand in a machining program for skim cuts, the wire electric discharge machine includes:
    a straight line portion instructing unit that outputs, when machining a straight line portion, to a servo amplifier a straight-line-portion-machining-feed-speed instruction specifying a machining feed speed for the straight line portion,
    an average speed calculating unit that calculates a straight-line-portion average speed for machining the straight line portion,
    a corner-portion detecting unit that looks ahead the machining program and outputs, if detecting a corner portion, corner-portion detection information about a corner portion's path,
    a volume ratio calculating unit that calculates, based on the corner-portion detection information, a machining volume ratio of a machining volume per a unit of distance at the corner portion to a machining volume per the unit of distance at the straight line portion,
    a corner-portion-machining-feed-speed calculating unit that calculates a machining feed speed for the corner portion as a product of the straight-line-portion average speed and an inverse of the machining volume ratio,
    a corner portion instructing unit that outputs, when machining the corner portion, to the servo amplifier, a corner-portion-machining-feed-speed instruction specifying the machining feed speed for the corner portion,
    wherein the machining volume per the unit of distance is an amount of a workpiece area removal when the wire electrode moves the unit of distance, from one point to another point on the programmed path,
    the machining volume per the unit of distance at the corner portion is equal to a portion of a sector delineated by a first arc and a second arc which have a central angle corresponding to a movement of the wire electrode from the one point to the another point on the programmed path,
    the first arc corresponds to the movement of the wire electrode from the one point to the another point on the programmed path in a previous cutting operation, and
    the second arc corresponds to the movement of the wire electrode from the one point to the another point on the programmed path in a current cutting operation.

2. The wire electric discharge machine according to claim 1, wherein the volume ratio calculating unit calculates the machining volume per the unit of distance at the corner portion, using a discharging gap value and a machining allowance value.

3. The wire electric discharge machine according to claim 2, further comprising:
    a machining condition storing unit that stores a previous machine-cutting condition; and
    a machining-allowance calculating unit that calculates the machining allowance value from a current machine-cutting condition and the previous machine-cutting condition stored in the machining condition storing unit,
    wherein the volume ratio calculating unit uses the machining allowance value calculated by the machining allowance calculate unit.

4. The wire electric discharge machine according to claim 2, further comprising a cautioning unit that cautions that the discharging gap value or the machining allowance value is not inputted.

5. The wire electric discharge machine according to claim 2, further comprising:
- a table storing unit that stores a discharging gap table in which a type of a machining power supply, electrical conditions set to the machining power supply, and a discharging gap value are associated for each skim cut; and
- a table referring unit that obtains, when the discharging gap value and the machining allowance value are not inputted, the discharging gap value and the machining allowance value by referring to the discharging gap table stored in the table storing unit,
- wherein the volume ratio calculating unit uses the discharging gap value and the machining allowance value that are obtained by the table referring unit.

6. The wire electric discharge machine according to claim 1, further comprising:
- a section calculating unit that calculates, based on the corner-portion detection information, a length of a first section in the straight line portion in which the machining volume per the unit of distance increases or decreases until a center of the wire electrode enters the corner portion, and a length of a second section in the corner portion in which the machining volume per the unit of distance increases or decreases until the center of the wire electrode enters another straight line portion,
- wherein the corner-portion-machining-feed-speed calculating unit calculates the machining feed speed at the corner portion before the center of the wire electrode enters the first section, and
- the corner portion machining feed speed instruction specifies the machining feed speed to be applied from when the center of the wire electrode enters the first section until the center of the wire electrode leaves the second section, based on the machining feed speed for the corner portion and the lengths of the first section and the second section.

7. The wire electric discharge machine according to claim 6, wherein the section calculating unit calculates the lengths of the first section and the second section, using a discharging gap value and a machining allowance value.

8. The wire electric discharge machine according to claim 1, wherein if the volume ratio calculating unit determines, based on the corner-portion detection information, that the corner portion is a concave corner to be machined along a circular arc path, an equation to calculate the machining volume per the unit of distance is selected for the corner portion based on whether or not there exists a mid-corner section in the corner portion where the machining volume per the unit of distance is constant.

9. The wire electric discharge machine according to claim 1, wherein if the volume ratio calculating unit determines, based on the corner-portion detection information, that the corner portion is a convex corner to be machined in an edge path, an equation to calculate the machining volume for each predetermined distance is selected for the corner portion based on a corner angle of the corner portion.

10. The wire electric discharge machine according to claim 1, wherein the corner-portion-machining-feed-speed calculating unit uses the straight-line-portion average speed calculated by the average speed calculating unit immediately before a wire electrode's center enters a first section, which is disposed in the straight line portion until the wire electrode's center enters the corner portion, and the machining volume ratio, to calculate the machining feed speed for the corner portion.

* * * * *